May 13, 1930.  J. ADERER  1,758,490
SOLDERING TWEEZERS
Filed Jan. 4, 1929
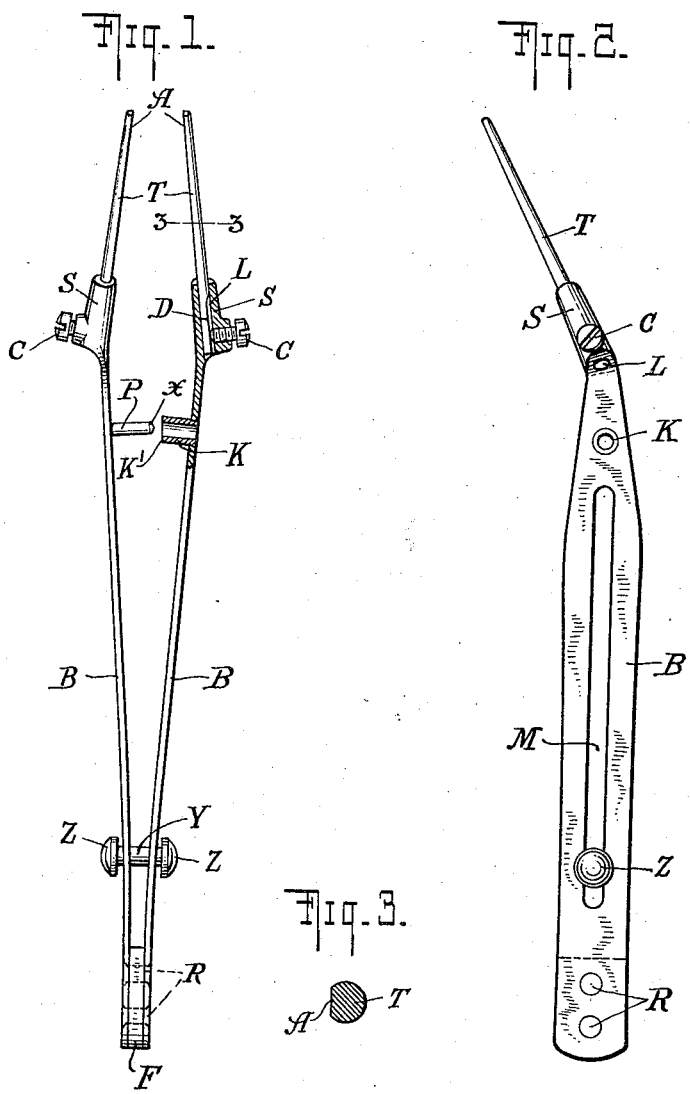

Patented May 13, 1930

1,758,490

UNITED STATES PATENT OFFICE

JULIUS ADERER, OF NEW YORK, N. Y.

SOLDERING TWEEZERS

Application filed January 4, 1929. Serial No. 330,244.

This invention relates to tweezers and more particularly to soldering tweezers of the dental type. The object of the invention is to effect an organization of operating elements which will be appropriate to the use of tungsten points and the several parts of which will be so coordinated as to assure a long life to the tungsten points and to prevent the likelihood in the normal use of the device of causing the brittle tungsten points to be broken.

The invention will be particularly described with reference to the dental art, but it is to be understood that the new tweezer construction is capable of use in other arts.

In modern dental work the dentist is required to conduct a large variety of operations which require high heat treatments of delicately formed articles usually composed of precious metals. The customary appliance used by dentists in connection with such work comprises an ordinary pair of soldering tweezers having steel points. The article to be treated is gripped between the steel points and is then in the thus gripped condition introduced into an electric furnace or other source of high heat. The effect of the heat is to cause the ends or tips to warp out of shape so that tweezers having steel tips enjoy a short life and rather speedily become useless as the result of the deformations suffered by the tweezers under application of pressure under high temperatures and the fact that the temper of the steel becomes affected.

In spite of the known disadvantages of ordinary steel tweezers their use is continued because all efforts to discover a substitute or an improvement have proven unsatisfactory and unsuccessful for reasons of a diverse nature.

It is one object of the present invention to overcome the shortcomings of the conventional steel tweezers and to provide tweezers of superior construction, of relatively long life, and resistant to intense thermal conditions and to corrosive action of metallic and chemical reagents.

Tweezers of my new construction are illustrated in the accompanying drawings in which Fig. 1 represents an elevation partly in section of a preferred form of my invention, and Fig. 2 represents a side view of the tweezers shown in Fig. 1, and Fig. 3 is an enlarged sectional view of the tip T of Figs. 1 and 2. In the drawings the reference character B designates the narrow spring steel blades united at one of their ends by the use of filler block F and the rivets R. At the other or free end of each of the blades a socket member S is arranged which is preferably made integral with the blade itself. This socket S is provided with a hollow longitudinal bore L. Set screw C extends transversely into the bores L. Seated within the bore of each socket and rigidly secured therein by the tightening of the set screws, is a replaceable tip T. This tip may be of a variety of shapes but a preferred shape is that of a round, blunt needle with a flat interior face A. The opposed flattened faces A provide means suitable for effectively gripping and for holding in a steady condition work pieces or pieces of solder or other material. At the ends of the tips near the set screws the opposite surfaces of the tips are preferably flattened as indicated at D in the sectional portion of Fig. 1, so as to provide an effective bearing or seat by means of which the set screw, when engaging said seat, will hold the tips rigidly. The tips T are not made of steel but of tungsten. They are brittle and have a relatively low elastic limit, so that if they were exposed to the possibility of being subjected to excessive lateral strains they would be practically incapable of use in connection with soldering tweezers. By adopting the organization of the tweezers illustrated in the drawings an organization is effected whereby, before any fracturing moment can occur in the tungsten tips the tweezer structure itself provides for a relief or for a positive stop. Thus it will be observed that near the free ends of the blades B a tube K extends from the inner surface of one of the blades with its hollow portion in register with the pin P that projects from the inner surface of the opposed blade. The tube K is shown as open at both ends. As the blades B are pressed together and the points of the tungsten tips close upon the work or upon each other, the tungsten tips are thereby begun to be placed under lateral strain. If the metal blades of the tweezers are pressed together with considerable force at this moment, the face K' of the tube K will seat itself against the inner surface of the opposed blade and thereupon, no matter how much pressure the operator applies to the tweezers, it is impossible to increase the lateral strain on the tungsten tips. In the intermediate ranges of relative movement between the pin P and the tube K these two elements serve to assure an accurate alignment between the opposed faces A of the tungsten tips T. Of course, instead of providing for contact between K' of the tube and the opposed blade, the structure may be mechanically reversed by closing the outer orifice of the tube and then the end X of the pin P will abut against the closed end of the tube K and the effect will be the same. With the particular structure illustrated in Fig. 1 where the pin P is arranged to extend through and beyond the end of the orifice of the tube K there is, however, the advantage that the operator, placing his thumb over the orifice, will feel the end of the pin coming through before the tube K has completed the entire extent of its possible movement with reference to the pin P. The operator thereby receives warning that the maximum limit of pressure capable of being applied to the tips of the tweezers is about to be reached and he can hold the tweezers at this point, short of complete compression of the blades B and thereby still further safeguard the life of the brittle tungsten tips and particularly in cases where the work piece is of larger than ordinary dimensions.

The blades B are flexible and resilient and yield readily under pressure of the operator and their resiliency is such as to absorb pressure applied by the operator before any fracturing moment occurs in the tungsten tips. In other words, if a large work piece is gripped by the tweezers and pressure is applied by the operator to the side of the blades to grip the work piece, the blades themselves will flex and thereby relieve a tendency to fracture the tungsten tips, which tendency could not be overcome if the blades were made of rigid and non-flexible material.

The blades B are provided with longitudinal slots M and within these slots the pin Y, having two expanded heads Z, is adapted to be moved. The distance between the inner surfaces of the two heads Z of the pin Y is considerably less than the normal space between the blades near their front ends so that as the pin Y is moved forward it will cause a gradual closing of the tungsten points toward each other. When, however, the tungsten points have closed upon the work or the tweezer has been so compressed that the tube K abutting against the opposed blade prevents further movement of the blades toward each other forward of the region P—K, any further forward movement of the pin Y will merely cause flexure of the blades rearwardly of the critical zone, so that any excess compression of the blades B under such conditions would be entirely taken up by the resiliency of the blades themselves and will not be deleteriously transmitted to the fragile tungsten tips.

By the described arrangements the points of the tungsten tips are protected against overstrain or fracture.

When the tweezers are used, the tungsten tips, notwithstanding the high temperatures to which they are subjected, do not become deformed. The tungsten tips have an extremely high melting point and little if any affinity for other metals. According to some authorities the melting point of tungsten is 5686° F., while that of steel is 2786° F. On the other hand, the specific heat of tungsten is only .0358, while that of iron is .1151. Tungsten is neither affected by sulfuric acid nor by hydrochloric acid and nitric acid attacks tungsten only very slowly. In every respect tungsten possesses notable advantages over iron or steel for the purposes of tweezer construction. However, to manufacture tweezers entirely of tungsten would make them too costly, even if it were possible to obtain the necessary size and if it were possible to fabricate all-tungsten tweezers. To solder tungsten tips to the ends of the ordinary steel tweezers would lead to a structure in which the disadvantage of frequent breakages of the tips would outweigh the advantages of the tungsten tips as such. For a satisfactory appliance of the type under consideration it is necessary that the tungsten tips should be at all times readily replaceable. Although, consequently, tubular elements and set screws may have been heretofore used as in drawing instruments, this particular type of construction acquires special importance and exercises special functions in connection with a tungsten tip tweezer.

In the tweezers illustrated in the drawings and thus far described, the dimensions of the tube K are such that it will operate to prevent further movement of the blades B toward each other at approximately the same moment that the points of the tips T come in contact with each other. In other words, the device prevents any slipping of the points past each other when pressure is applied.

It will be observed that in the organization and composite structure of my tweezers all the elements have been co-ordinated to a common end. The resultant structure is the first and only (so far as I am aware) satisfactory and practical tungsten tip tweezer. It represents an instrumentality which has long been desired, particularly in the dental art, and which is of great practical utility and benefit. The manufacture of the new tweezers is relatively simple and inexpensive. The tweezer structure itself, not being rendered useless after a short period of time as was the case with steel-tipped tweezers, possesses a relatively unlimited life. The tungsten tips can be made and supplied to the users independently of the steel tweezer structure. These and other features of my new structure all result in enormous advantages which will be readily apparent to those skilled in the art.

I claim:

1. A soldering tweezer comprising a pair of spring blades, united at one end and free at their other ends, tungsten tips associated with the free ends of said blades, and means on intermediate portions of the blades arranged so to cooperate that the tips can only assume a predetermined alignment, said means being dimensioned to exercise their said cooperative relation materially in advance of the moment at which the tungsten tips close upon the work piece or each other, and an abutment associated with one of the blades adapted to contact with a mating abutment on the other blade when the blades are compressed to a predetermined angular position, the resiliency of the blades being such as to yield readily at least up to the time that said abutments make contact with each other under pressure of the operator and to absorb the said pressure before any fracturing moment occurs in the tungsten tips.

2. A soldering tweezer comprising a pair of spring blades united at one end and free at their other ends, tungsten tips associated with the free ends of said blades, a pin projecting from the inside of one blade toward the opposed blade, a tubular member projecting from the inside of said opposed blade in alignment with and fitting upon said pin, said tubular member and pin being respectively of such length as to cause inter-engagement materially prior to the closing of the tungsten tips upon the work piece and also to cause engagement between the face of at least one of the elements comprising the tube and pin and the inside of the opposed blade when the blades are compressed to a predetermined angular position, the resiliency of the blades being such as to yield readily under pressure of the operator and to absorb the said pressure before any fracturing moment occurs in the tungsten tips.

3. A soldering tweezer comprising a pair of spring blades united at one end and free at their other ends, tungsten tips associated with the free ends of said blades, a pin projecting from the inside of one blade toward the opposed blade, a tubular member projecting from the inside of said opposed blade in alignment with and fitting upon said pin, an aperture in said opposed blade in alignment with the axis of the tubular member and adapted to receive the free end of the pin when said pin has moved through said tubular member, said tubular member and pin being respectively of such length as to cause inter-engagement materially prior to the closing of the tungsten tips upon the work piece and also to cause engagement between the face of the tube and the inside of the opposed blade when the blades are compressed to a predetermined angular position, the resiliency of the blades being such as to yield readily under pressure of the operator and to absorb the said pressure before any fracturing moment occurs in the tungsten tips.

4. A soldering tweezer comprising a pair of spring blades, slots in each of the blades, a pin slidably movable in said slots, enlarged heads on the ends of the pin to prevent the escape of the pin from the slots, the distance between the heads being smaller than the distance between those ends of the slots which are nearer the free ends of the blades, tungsten tips associated with the free ends of said blades, a pin projecting from the inside of one blade toward the opposed blade, a tubular member projecting from the inside of said opposed blade in alignment with and fitting upon said pin, an aperture in said opposed blade in alignment with the axis of the tubular member and adapted to receive the free end of the pin when said pin has moved through said tubular member, said tubular member and pin being respectively of such length as to cause inter-engagement materially prior to the closing of the tungsten tips upon the work piece and also to cause engagement between the face of the tube and the inside of the opposed blade when the blades are compressed to a predetermined annular position, the resiliency of the blades being such as to yield readily under pressure of the operator and to absorb the said pressure before any fracturing moment occurs in the tungsten tips.

In testimony whereof I have hereunto set my hand.

JULIUS ADERER.